Patented Aug. 30, 1932

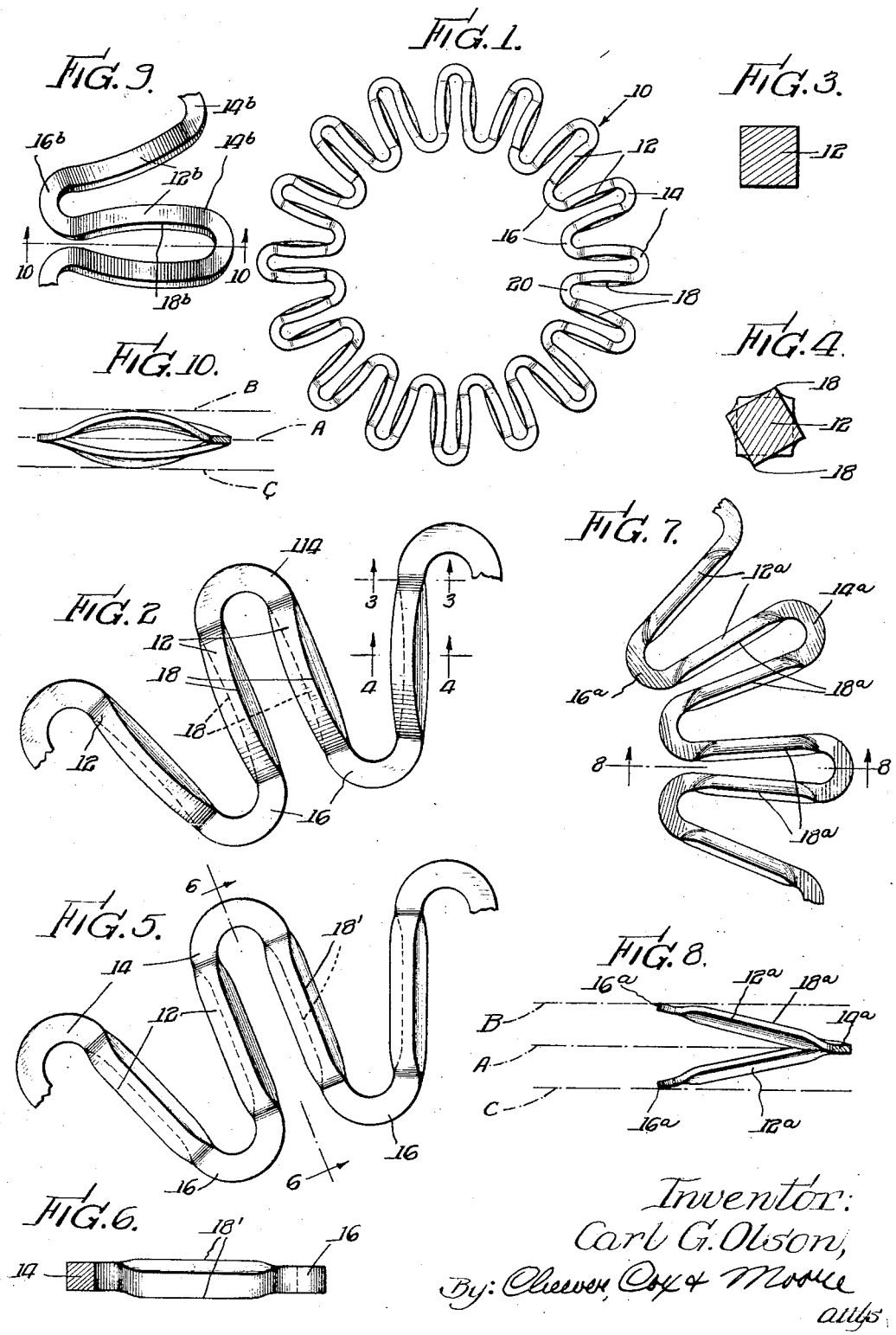

1,874,597

UNITED STATES PATENT OFFICE

CARL G. OLSON, OF CHICAGO, ILLINOIS, ASSIGNOR TO SHAKEPROOF LOCK WASHER COMPANY, OF CHICAGO, ILLINOIS, A CORPORATION OF DELAWARE

LOCK WASHER

Application filed June 24, 1931. Serial No. 546,541.

My invention relates generally to lock washers, but more particularly to lock washers comprised of a plurality of radial locking elements connected at the inner and outer margins thereof.

One of the objects of my invention is to provide a lock washer having a novel arrangement of radial locking elements, and to this end I propose to provide a washer comprised of a plurality of substantially radial members warped out of the plane of the washer so as to present work engaging corners or edges, each of said radial members being connected at its inner and outer extremities with another member.

More specifically, my invention contemplates the provision of a washer which may be formed from elongated stock such as flat or square wire stock, said stock being bent or otherwise formed into a plurality of adjacently positioned radial locking members, inner and outer loops of the wire serving to connect adjacent radial sections.

It is a further object of my present invention to provide a washer as above set forth which is not only provided with locking elements for rigidly securing parts together, but which is provided with elements designed to resiliently oppose the force of clamping members tightened thereagainst.

Still more specifically, my invention contemplates the provision of the above mentioned radially extending locking members alternately disposed in opposite directions out of the plane of the washer stock so as to render said sections resilient, and thereby enhance the binding or locking effectiveness of said sections.

The foregoing and numerous other objects and advantages will be more apparent from the following detailed description when considered in connection with the accompanying drawing, wherein—

Figure 1 is a plan view of a washer which represents one embodiment of my invention;

Figure 2 is an enlarged fragmentary view of the washer shown in Figure 1;

Figure 3 is an enlarged transverse sectional view taken substantially along the line 3—3 of Figure 2;

Figure 4 is a similar transverse sectional view taken substantially along the line 4—4 of Figure 2;

Figure 5 is a view similar to Figure 2 disclosing radial locking elements of modified construction;

Figure 6 is a sectional view taken substantially along the line 6—6 of Figure 5;

Figure 7 discloses another modification of the general type of washer shown in Figures 1 to 6 inclusive;

Figure 8 is a sectional view of the washer shown in Figure 7 taken substantially along the line 8—8 of Figure 7;

Figure 9 is still another modified form; and

Figure 10 is a sectional view taken substantially along the line 10—10 of Figure 9.

Referring now to the drawing more in detail wherein like numerals have been employed to designate similar parts throughout the various figures, it will be observed in Figures 1 to 4 inclusive that one embodiment of my invention comprises a washer designated generally by the numeral 10. This washer is made up of a single strip of square stock and comprises a plurality of radially disposed locking elements 12. These elements are connected at their outer extremities by arcuate sections 14 and at their inner extremities by arcuate or U-shaped sections 16. Each pair of locking elements or sections 12 connected by the outer sections 14 present a U-shaped construction having its open portion along the inner margin of the washer, while the locking sections 12 connected by the inner arcuate section 16 present U-shaped constructions which open outwardly.

The locking sections 12 may be twisted or warped so as to present work engaging edges 18 on opposite sides of the plane of the washer. In Figures 1 and 2 it will be seen that these work engaging or locking edges 18 partake of an arcuate form with the crest of each arcuate edge forming the point of maximum deflection of said edge out of the plane of the washer. The washer 10 may be made, as set forth above, by employing a single strip of square stock, the extremities of which are brought together and secured by welding or the like at a point designated by the numeral 20 in Figure 1. Obviously the U-shaped sections of the washer may be made prior to the welding of the stock extremities, or these U-shaped sections may be made from an annular section of square stock by employing suitable dies and the like.

It will be apparent that when the washer 10 is clamped between the surfaces of a nut and a work piece, the edges 18 will imbed themselves within these surfaces, and in this manner effectively secure the nut against retrograde movement. If the nature of the work is such as to require a more effective locking action, the sections 12 of the washer may be formed so as to present work engaging edges 18 shown in Figure 5, which are straight over a substantial portion of their length. These edges 18 lie in planes spaced from and substantially parallel with the normal plane of the remaining portion of the washer structure, and when a work piece is clamped thereagainst substantially the entire lengths of these straight edges become imbedded within said work piece.

Attention is now directed to the washer construction shown fragmentarily in Figures 7 and 8. This construction is similar to that disclosed in Figures 1 to 6 inclusive, in that a plurality of U-shaped sections comprised of radial locking sections 12a and inner and outer connecting sections 16a and 14a respectively are provided. It will be seen, however, that the washer of Figure 7 is made from stock which is rectangular in cross section, and that alternate locking sections are sprung in opposite directions out of the plane of the connecting sections 14a, Figure 8. In other words, the outer connecting sections 14a are positioned within a common plane, while one of the locking sections 12a extending from each of the sections 14a is deflected or inclined out of the plane designated by a dot-and-dash line A, Figure 8, and the other locking sections are deflected in the opposite direction out of said plane. This positions the alternate inner connecting sections 16a in planes B and C which are spaced from the central plane A. By having the alternate locking members 12a deflected out of the plane A in one direction and the other alternate sections deflected out of the plane A in the opposite direction, the resiliency of the washer is materially increased. Thus, when a work piece is clamped against the washer, the resiliency of these deflected locking sections must first be overcome, and upon continued tightening, locking edges 18a imbed themselves within the work piece. Should the space between the clamping members vary, the resiliency presented in the washer will serve to maintain contact between the locking edges 18a and the surfaces of the work pieces.

Another form of washer of the general type heretofore described is shown in Figure 9. In this figure the washer is provided with substantially radial locking elements or sections 12b, which are connected at their inner and outer extremities by arcuate sections 16b and 14b respectively. Particular attention is directed to the fact that the alternate sections 12B are arcuately deflected out of the plane A of the washer in a given direction and the other alternate sections are arcuately deflected out of said plane in the opposite direction. Thus, in the washer structure shown in Figures 9 and 10, the inner and outer connecting sections 16b and 14b lie in the common plane A, while alternate arcuate locking edges 18b have their outermost portions positioned within the plane B, while the other alternate outermost edges are positioned within the plane C. It will be apparent that when a work piece is clamped against the locking sections 12b, the resiliency of said sections, which is occasioned as a result of their arcuate deflection, serves similarly to their deflected sections 12a of Figure 8 to resiliently oppose the tightening force applied to the washer.

From the foregoing it will be apparent that my invention contemplates the provision of an improved and efficiently operable lock washer which may be conveniently formed from square and rectangular stock or stock having other cross sectional shapes. The washer shown in Figures 1 to 6 inclusive is provided with firm or substantially rigid locking edges, and as the work pieces are clamped against these edges, there will be a tendency for the radial sections to roll on their axes, and thereby provide an effective locking strut between the adjacent surface of the clamping members. By forming the washers in the manner shown in Figures 8 and 9, increased resiliency is obtained, and this resiliency serves to expedite the efficient functioning of the washer, particularly in instances where the clamping members are subjected to variation in spaced relationship while in use. Obviously the invention is not limited to the specific forms of locking elements or shapes of stock disclosed in the drawing, but is capable of many other modifications and changes without departing from the spirit and scope of the appended claims.

Having thus described my invention, what I claim as new and desire to secure by Letters Patent is:

1. A lock washer of the class described including a plurality of substantially radial locking elements disposed about the axis of said washer, connecting sections at the inner and outer ends of said radial locking elements, said elements and connecting sections presenting a zigzag structure, the portions of said radial elements extending between said connecting sections being warped so as to present edges out of the plane of the washer for lockingly engaging a work piece clamped thereagainst.

2. A lock washer of the class described including a plurality of substantially radial locking elements disposed about the axis of said washer, connecting sections at the inner and outer ends of said radial locking elements, said elements and connecting sections presenting a zigzag structure, the portions of said radial elements extending between said connecting sections being warped so as to present edges out of the plane of the washer for lockingly engaging a work piece clamped thereagainst, said elements being also flexed out of the plane of the washer proper so as to resiliently oppose the clamping action of said work piece.

3. A lock washer of the class described including a plurality of substantially radial locking elements disposed about the axis of said washer, connecting sections at the inner and outer ends of said radial locking elements, said elements and connecting sections presenting a zigzag structure, the portions of said radial elements extending between said connecting sections being warped so as to present edges out of the plane of the washer for lockingly engaging a work piece clamped thereagainst, certain of the radial sections being deflected out of the plane of the washer proper in a given direction to render the same resilient and the remaining radial sections being deflected in the opposite direction so as to render them resilient.

4. A lock washer of the class described including a plurality of substantially radial locking elements disposed about the axis of said washer, connecting sections at the inner and outer ends of said radial locking elements said elements and connecting sections presenting a zigzag structure, the portions of said radial elements extending between said connecting sections being warped so as to present edges out of the plane of the washer for lockingly engaging a work piece clamped thereagainst, alternate radial sections being deflected out of the plane of the washer proper in a given direction to render the same resilient and the other alternate radial sections being deflected out of the plane of the washer proper in the opposite direction.

5. A lock washer of the class described comprised of a strip of square metallic stock and including a plurality of adjacently positioned U-shaped elements, each of said U-shaped elements including a pair of radial bars, substantially the entire length of each bar being twisted so as to present work engaging edges on opposite sides thereof for lockingly engaging a tightening element, such as a nut, when clamped thereagainst.

In witness whereof, I have hereunto subscribed my name.

CARL G. OLSON.